(12) United States Patent
Gradwell

(10) Patent No.: US 7,384,022 B2
(45) Date of Patent: Jun. 10, 2008

(54) SEAL ARRANGEMENT FOR A PISTON VALVE

(75) Inventor: Colin Gradwell, Melksham (GB)

(73) Assignee: Knorr-Bremse Rail Systems (UK) Ltd., Melksham (GB)

( * ) Notice: Subject to any disclaimer, the term of this patent is extended or adjusted under 35 U.S.C. 154(b) by 192 days.

(21) Appl. No.: 10/561,198

(22) PCT Filed: Jun. 16, 2004

(86) PCT No.: PCT/GB2004/002548

§ 371 (c)(1),
(2), (4) Date: May 31, 2006

(87) PCT Pub. No.: WO2004/113773

PCT Pub. Date: Dec. 29, 2004

(65) Prior Publication Data

US 2006/0266973 A1    Nov. 30, 2006

(30) Foreign Application Priority Data

Jun. 18, 2003  (GB) ................................ 0314183.5

(51) Int. Cl.
*F16K 29/00*  (2006.01)

(52) U.S. Cl. ..................... 251/324; 251/30.05; 251/47; 251/368; 251/900

(58) Field of Classification Search ................ 251/324, 251/30.02, 30.05, 47, 368, 900
See application file for complete search history.

(56) References Cited

U.S. PATENT DOCUMENTS

| | | | | |
|---|---|---|---|---|
| 2,314,683 A * | 3/1943 | Berry | ......................... | 251/900 |
| 3,841,724 A * | 10/1974 | Calabrese | .................... | 384/625 |
| 4,014,510 A * | 3/1977 | Smith | ......................... | 251/900 |
| 4,257,442 A * | 3/1981 | Claycomb | .................... | 251/324 |
| 4,414,882 A * | 11/1983 | Frei | ........................... | 251/900 |
| 4,659,061 A * | 4/1987 | Scheffel | ....................... | 251/900 |
| 5,775,892 A * | 7/1998 | Miyasaka et al. | ......... | 123/193.2 |
| 6,372,115 B1 * | 4/2002 | Miyasaka et al. | ............ | 205/204 |
| 2004/0221894 A1 * | 11/2004 | Henley et al. | .......... | 137/505.25 |

FOREIGN PATENT DOCUMENTS

| | | |
|---|---|---|
| DE | 3641209 A1 | 6/1988 |
| EP | 0380302 A3 | 8/1990 |
| GB | 2294471 A | 5/1996 |

* cited by examiner

*Primary Examiner*—John Bastianelli
(74) *Attorney, Agent, or Firm*—Barnes & Thornburg LLP

(57) ABSTRACT

A sliding seal arrangement in particular for a valve having an anodised aluminium coating in contact with the seal. The coating is produced so that inclusions in the surface of the coating are substantially aligned. The direction of motion of the sliding seal in use is then substantially aligned with the direction of the inclusions resulting in greatly reduced wear on the seal.

7 Claims, 1 Drawing Sheet

SEAL ARRANGEMENT FOR A PISTON VALVE

FIELD OF THE INVENTION

The invention relates to a piston valve unit for a braking system and in particular, but not exclusively, a seal arrangement for a piston valve unit.

BACKGROUND OF THE INVENTION

In the railway industry, there are standard service intervals and lifetimes for various components. The standard servicing interval for most components is nine years and the component is expected to have a lifetime of forty years. Railway cars also exhibit high usage compared to other land based forms of transport.

Conventional brake systems for railway cars are pneumatically driven and generally use diaphragm valves to control the application and release of pressure to the brake actuators. Considering the normal usage of a railway car, it is expected that the valve will have 44 million open/close cycles between services and a life time of 196 million open/close cycles. Diaphragm valves have been the preferred option historically due to their reliability and robustness, which permits the industry standard servicing intervals and lifetimes to be met.

However, for more modem systems, it is desirable to have electronic control of the brake system to permit new technologies to be introduced. One possibility is the use of a piston valve type arrangement, in which the piston position is toggled between two positions. To maintain the pressure in the valve, the piston is provided with piston rings. However, a significant problem with piston valves is that the wear on the surface of the piston bore and piston ring is high and in many cases leads to failure of the valve between servicing intervals.

SUMMARY OF THE INVENTION

The present invention seeks to provide a piston valve unit having a seal arrangement with reduced likelihood of failure between service intervals and a higher operational life for the bore.

According to the invention there is provided a seal arrangement for a sliding seal, which seal arrangement is disposed on a body adapted to move in use, the seal arrangement being adapted to provide a seal between the moving body and a surface of a second body, wherein the second body is formed of a material having substantially aligned inclusions or micro-cracks formed in the surface of the second body, which inclusions or micro-cracks have a longitudinal direction wherein, in use, the direction of motion of the seal arrangement is substantially parallel to the longitudinal direction of the inclusions or micro-cracks.

In a preferred embodiment, the seal arrangement comprises an O ring, the moving body comprises a piston and the second body comprises a piston bore. Preferably, the seal has a circular cross-section. Preferably, the second body is formed from an extruded material. Preferably, the second body is formed of extruded anodised aluminium. Preferably, the seal is formed of polyurethane.

In a preferred embodiment the seal arrangement is provided in a brake valve arrangement for a railway vehicle braking system comprising a piston valve.

An exemplary embodiment of the invention will now be described in greater detail with reference to the drawings in which:

DETAILED DESCRIPTION OF THE INVENTION

Figure 1:
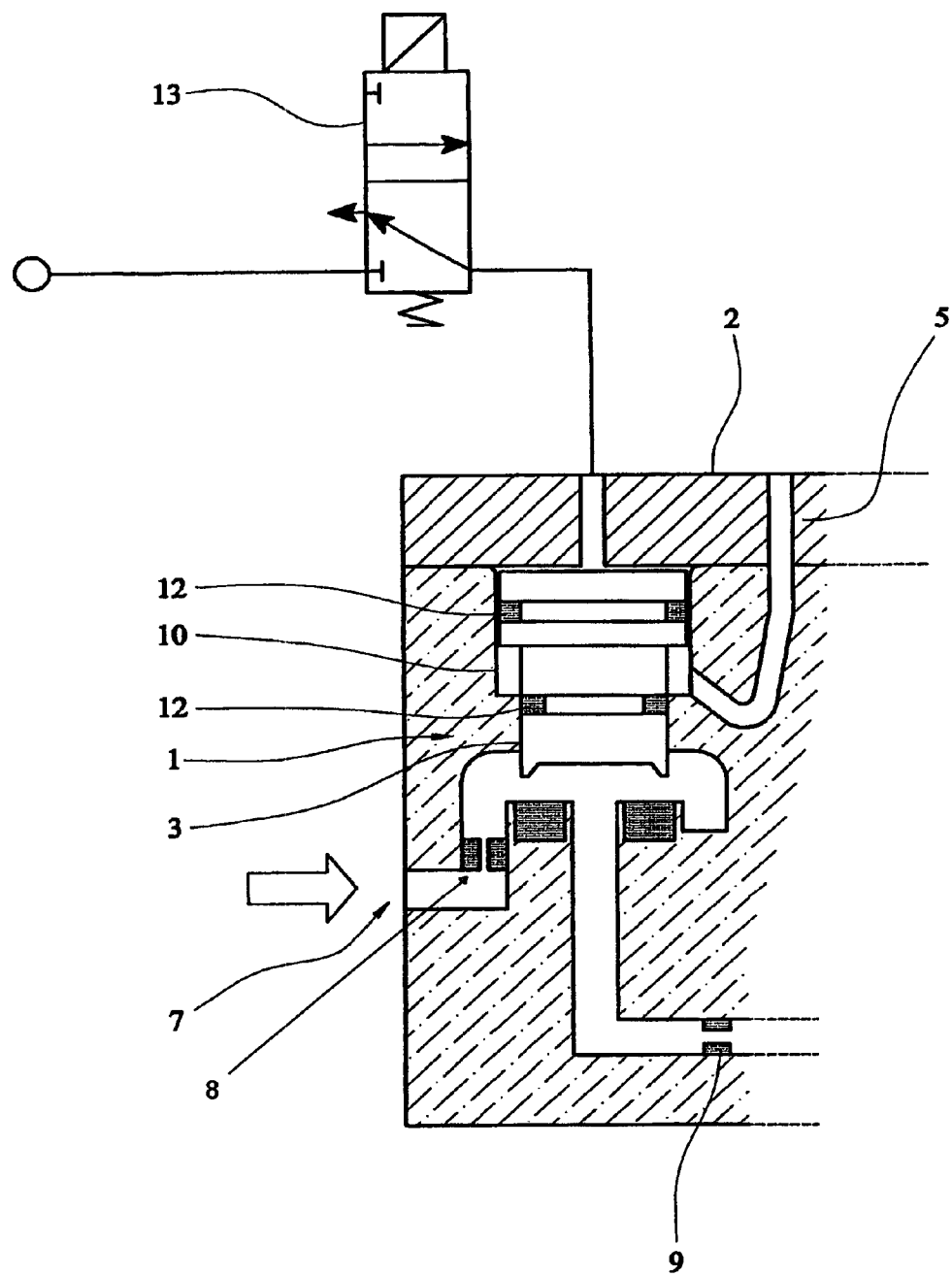
FIG. 1 shows a piston valve unit.

FIG. 1 shows a piston valve unit for use in a pneumatic railway brake system comprising a main body 1 and a top body 2 disposed on the upper surface of the main body 1, wherein the main body 1 is provided with a piston bore 3, which piston bore is vented by a further bore 5. The main air supply is provided via an air passage 7 having a choke 8 to a first piston bore 3. The air passage 7 then divides with one arm passing to an output stage and the second arm passing to an exhaust passage with a choke 9 at its lower end, which is adapted to vent the valve.

The piston bore 3 have a stepped structure with the narrower cross section located at the lower part of the bore. Each piston bore is provided with a piston 10 having a stepped cross section with the narrower cross section located at the bottom end and the wider cross section located at the upper end. Each section is provided with a piston ring 12. The operation of each valve is controlled by a respective micro-solenoid 13 which controls the application of a pilot pressure into the respective upper chambers of the valves. The pistons toggle between two positions with a stroke of several millimetres.

The seal 12 is typically a polyurethane O-ring, although other squeeze seal designs are possible, and the body of the valve is made from extruded aluminium. The piston bore 3 is anodised.

The number of sliding operations over which the seals 12 maintain the required performance is dependent on many factors such as material hardness, lubrication, temperature of operation and frictional values of materials.

It has been discovered that the initial surface finish within reasonable tolerances has little effect on the lifetime of the seals 12. However, equally the failure of the sealing arrangement is surprisingly not caused by wear of the ring. The microstructure of the base material surface will typically show many inclusions or micro-cracks. Such inclusions or micro-cracks are generally irregular in shape and so have a longitudinal length which is greater than the lateral width. The hard anodised coating is porous and columns of inclusions extend to the surface undermining the near surface material making this friable, which then in use cause craters. As the seal slides across the craters, approximately perpendicular to the inclusion elongation causing the edges of the crater to crack and eventually break away, thus increasing the size of the crater. The hard particles of aluminium released in this way become trapped between the seal 12 and the piston bore 3 and act as an abrasive both embedding in the seal and wearing away the surface of the piston bore, which in turn will lead to a reduction in sealing efficiency and the failure of the valve.

Surprisingly, it has been further discovered that the inclusions are substantially oriented in the direction that the base material is extruded and that when a sliding force is applied along the inclusion, the surface material exhibits different behaviour and the edges of the crater do not crack to the same extent as with an inclusion having a different orientation. Therefore if the grain structure of the base material forming the piston bores is longitudinally aligned with the direction of motion of the seal, the action of the sliding seal causes the seal to bed in rather than abrade. This provides a greatly increased seal life.

Although the base material has been described as extruded aluminium, it would be possible to use other materials. It would also be possible to use manufacturing techniques other than extrusion as long as these exhibit substantially aligned micro-cracks and inclusions.

The invention claimed is:

1. A seal arrangement for a sliding seal, which seal arrangement is disposed on a body adapted to move in use, the seal arrangement being adapted to provide a seal between the moving body and a surface of a second body, wherein the second body is formed of a material having substantially aligned inclusions or micro-cracks formed in the surface of the second body, which inclusions or micro-cracks have a longitudinal direction, wherein, in use, the direction of motion of the seal arrangement is substantially parallel to the longitudinal direction of the inclusions or micro-cracks.

2. A seal arrangement according to claim 1, wherein the seal arrangement comprises an O ring, the moving body comprises a piston and the second body comprises a piston bore.

3. A seal arrangement according to claim 1, wherein the seal has a circular cross-section.

4. A seal arrangement according to claim 1, wherein the second body is formed from an extruded material.

5. A seal arrangement according to claim 4, wherein the second body is formed of extruded andonized aluminum.

6. A seal arrangement according to claim 1, wherein the seal is formed of polyurethane.

7. A brake valve arrangement for a railway vehicle braking system comprising a piston valve having a seal arrangement according to claim 2.

\* \* \* \* \*